(12) United States Patent
Takasu et al.

(10) Patent No.: US 12,226,755 B2
(45) Date of Patent: Feb. 18, 2025

(54) EXHAUST GAS PURIFICATION CATALYST

(71) Applicant: Cataler Corporation, Kakegawa (JP)

(72) Inventors: Ryosuke Takasu, Kakegawa (JP);
Shunsuke Oishi, Kakegawa (JP);
Takaya Ota, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 267 days.

(21) Appl. No.: 18/011,940

(22) PCT Filed: Jun. 28, 2021

(86) PCT No.: PCT/JP2021/024316
§ 371 (c)(1),
(2) Date: Dec. 21, 2022

(87) PCT Pub. No.: WO2022/004638
PCT Pub. Date: Jan. 6, 2022

(65) Prior Publication Data
US 2023/0249159 A1 Aug. 10, 2023

(30) Foreign Application Priority Data
Jun. 30, 2020 (JP) .................................. 2020-112745

(51) Int. Cl.
*B01J 21/04* (2006.01)
*B01D 53/94* (2006.01)
(Continued)

(52) U.S. Cl.
CPC .............. *B01J 23/63* (2013.01); *B01D 53/94* (2013.01); *B01J 35/56* (2024.01); *B01J 35/633* (2024.01);
(Continued)

(58) Field of Classification Search
CPC ... B01J 21/04; B01J 23/10; B01J 23/44; B01J 23/464; B01J 23/63; B01J 35/56;
(Continued)

(56) References Cited

U.S. PATENT DOCUMENTS 7,754,171 B2 * 7/2010 Chen .................... B01J 37/0244
60/302
7,833,930 B2 * 11/2010 Kikuchi ............... B01J 37/0248
502/308
(Continued)

FOREIGN PATENT DOCUMENTS

EP 3323498 A1 5/2018
JP 2011255270 A 12/2011
(Continued)

OTHER PUBLICATIONS

Japanese Office Action, issued Oct. 14, 2021 (3 pages).
(Continued)

*Primary Examiner* — Cam N. Nguyen
(74) *Attorney, Agent, or Firm* — Occhiuti & Rohlicek LLP

(57) ABSTRACT

An exhaust gas purification catalyst showing resistance to peeling and high purification performance is provided. The present invention is an exhaust gas purification catalyst including a base material and a catalyst layer disposed on the base material. The catalyst layer includes a catalytic metal, a first metal oxide, and a second metal oxide having a higher heat resistance than that of the first metal oxide. When Dx is an area-based average particle diameter of the first metal oxide determined from an arbitrary cross section of the catalyst layer and Dy is an area-based particle diameter of the second metal oxide 22 measured from the cross section of the catalyst layer, a ratio of the Dy to the Dx (Dy/Dx) is 5 or more, and the Dy is 7 μm or more. In the catalyst layer, pore volume of pores having pore diameters 30 nm or more
(Continued)

measured by a nitrogen adsorption method is 0.28 cm³/g or more.

12 Claims, 5 Drawing Sheets

(51) Int. Cl.
    *B01J 23/10*     (2006.01)
    *B01J 23/44*     (2006.01)
    *B01J 23/46*     (2006.01)
    *B01J 23/63*     (2006.01)
    *B01J 35/56*     (2024.01)
    *B01J 35/63*     (2024.01)
    *B01J 35/64*     (2024.01)
    *F01N 3/28*     (2006.01)

(52) U.S. Cl.
    CPC ........... *B01J 35/635* (2024.01); *B01J 35/647* (2024.01); *F01N 3/2828* (2013.01); *B01D 2255/1023* (2013.01); *B01D 2255/1025* (2013.01); *B01D 2255/2065* (2013.01); *B01D 2255/9022* (2013.01); *B01D 2255/9202* (2013.01); *B01D 2258/012* (2013.01); *F01N 2370/02* (2013.01)

(58) Field of Classification Search
    CPC ...... B01J 35/633; B01J 35/635; B01J 35/647; B01J 53/94; F01N 3/2828
    USPC ........... 502/304, 332–334, 355, 415, 527.12, 502/527.13
    See application file for complete search history.

(56) References Cited

U.S. PATENT DOCUMENTS

| | | | | |
|---|---|---|---|---|
| 8,796,172 | B2* | 8/2014 | Chinzei | B01D 53/945 502/262 |
| 8,950,174 | B2* | 2/2015 | Hilgendorff | B01J 23/63 60/299 |
| 9,242,242 | B2* | 1/2016 | Hilgendorff | B01J 23/63 |
| 9,656,209 | B2* | 5/2017 | Chang | B01J 23/464 |
| 9,993,804 | B2* | 6/2018 | Saito | B01J 35/40 |
| 10,086,363 | B2* | 10/2018 | Onoe | B01D 46/2429 |
| 2002/0132730 | A1* | 9/2002 | Hwang | B01J 37/0226 502/212 |
| 2002/0160912 | A1* | 10/2002 | Morikawa | F01N 3/2803 502/349 |
| 2008/0167181 | A1 | 7/2008 | Nakamura et al. | |
| 2008/0254978 | A1 | 10/2008 | Kikuchi et al. | |
| 2010/0189615 | A1 | 7/2010 | Gramiccioni | |
| 2011/0305615 | A1* | 12/2011 | Hilgendorff | B01J 37/0036 60/299 |
| 2012/0055142 | A1* | 3/2012 | Hilgendorff | B01J 23/63 502/328 |
| 2015/0273462 | A1 | 10/2015 | Iwakura et al. | |
| 2017/0232425 | A1 | 8/2017 | Kimura et al. | |
| 2017/0291163 | A1 | 10/2017 | Saito et al. | |
| 2018/0008973 | A1 | 1/2018 | Gramiccioni et al. | |
| 2019/0126247 | A1* | 5/2019 | Deeba | B01J 29/7007 |
| 2019/0160427 | A1* | 5/2019 | Deeba | B01J 35/23 |
| 2019/0193057 | A1* | 6/2019 | Hoshino | F01N 3/24 |
| 2019/0240643 | A1* | 8/2019 | Karpov | B01J 37/0244 |

FOREIGN PATENT DOCUMENTS

| | | |
|---|---|---|
| JP | 2015171716 A | 10/2015 |
| JP | 2017189735 A | 10/2017 |
| JP | 2018108552 A | 7/2018 |
| JP | 2018150811 A | 9/2018 |
| WO | 2015037613 A1 | 3/2015 |
| WO | 2016092957 A1 | 6/2016 |

OTHER PUBLICATIONS

International Search Report, PCT Application No. PCT/JP2021/024316, mailed Aug. 24, 2021 (3 pages).

Extended European Search Report issued in European Application No. 21833616.2 dated Sep. 21, 2023.

English Translation of the International Preliminary Report on Patentability and Written Opinion issued in PCT Application No. PCT/JP2021/024316 dated Jan. 12, 2023.

* cited by examiner

PORE CAPACITY OF PORES HAVING PORE DIAMETERS OF 30 nm OR MORE (cm³/g)

EXHAUST GAS PURIFICATION CATALYST

CROSS REFERENCE TO RELATED APPLICATIONS

This application is a U.S. national stage application of International Application no. PCT/JP2021/024316, filed Jun. 28, 2021, which claims the benefit of the filing date of JP Application No. 2020-112745, filed Jun. 30, 2020, the contents of which are hereby incorporated by reference in their entirety.

TECHNICAL FIELD

The present invention relates to an exhaust gas purification catalyst. This application claims the benefit of priority to Japanese Patent Application No. 2020-112745 filed on Jun. 30, 2020. The entire contents of this application are hereby incorporated herein by reference.

BACKGROUND ART

An exhaust gas emitted from an internal combustion engine such as an automobile engine contains harmful components such as hydrocarbon (HC), carbon monoxide (CO), and nitrogen oxide (NOx). To cause reaction and remove these harmful components from the exhaust gas effectively, exhaust gas purification catalysts have been conventionally employed. In a typical structure of the exhaust gas purification catalysts, a catalyst layer including a catalytic metal such as platinum (Pt), palladium (Pd), or rhodium (Rh) and a support material such as alumina is formed on a base material having high heat resistance such as ceramic. Patent Documents 1 through 4 are prior art documents related to exhaust gas purification.

For example, Patent Document 1 discloses that two or more support materials having different average particle diameters are used for forming a predetermined proportion of voids with a predetermined size in a catalyst layer. Patent Document 1 describes that formation of the predetermined proportion of voids with a predetermined size in the catalyst layer can enhance gas diffusibility in the catalyst layer to enable enhanced purification performance

CITATION LIST

Patent Documents

Patent Document 1: Japanese Unexamined Patent Application Publication No. 2015-171716
Patent Document 2: Japanese Unexamined Patent Application Publication No. 2017-189735
Patent Document 3: International Patent Publication No. WO2016/092957
Patent Document 4: Japanese Unexamined Patent Application Publication No. 2018-150811

SUMMARY OF INVENTION

Technical Problems

An exhaust gas purification catalyst mounted in, for example, an automobile is subjected to an external force such as vibrations during use. In general, a catalyst layer having a large amount of voids has smaller contact points with adjacent portions (e.g., a base material or another catalyst layer) than a catalyst layer having a small amount of voids. Thus, when vibrations or the like are applied during use, the catalyst layer might be easily peeled off from the base material or the other catalyst layer, resulting in the possibility of decrease of durability. For this reason, it can be an object to obtain high purification performance even after duration by suppressing peeling of the catalyst layer and enhancing gas diffusibility.

It is therefore an object of the present invention to provide an exhaust gas purification catalyst having both high resistance to peeling and high purification performance.

Solution to Problems

According to the present invention, an exhaust gas purification catalyst is provided which includes: a base material; and a catalyst layer disposed on the base material. The catalyst layer includes a catalytic metal, a first metal oxide, and a second metal oxide having a higher heat resistance than a heat resistance of the first metal oxide. When $Dx$ is an area-based average particle diameter of the first metal oxide determined from an arbitrary cross section of the catalyst layer and $Dy$ is an area-based average particle diameter of the second metal oxide determined from the arbitrary cross section of the catalyst layer, a ratio of the $Dy$ to the $Dx$ ($Dy/Dx$) is 5 or more, and $Dy$ is 7 μm or more. A pore volume of pores having pore diameters of 30 nm or more in the catalyst layer measured by a nitrogen adsorption method is 0.28 $cm^3/g$ or more.

In the exhaust gas purification catalyst, a large amount of large pores (pores having pore diameters of 30 nm or more) considered to be effective for gas diffusion is provided in the catalyst layer. Accordingly, an exhaust gas is widely diffused in the catalyst layer to increase contact between the exhaust gas and the catalytic metal so that high purification performance can be thereby obtained. In the exhaust gas purification catalyst, a large amount of large pores are provided, the ratio of average particle diameters of the two types of metal oxides ($Dy/Dx$) is a predetermined value or more, and the average particle diameter of the second metal oxide having relatively high heat resistance is a predetermined value or more so that heat resistance of the catalyst layer is thereby effectively increased. Accordingly, peeling of the catalyst layer can be suppressed. In addition, coarsening of metal oxides due to thermal degradation or a neck phenomenon can be suppressed, and sintering due to grain growth of a catalytic metal can be suppressed. Accordingly, the exhaust gas purification catalyst can have high purification performance over a long period.

In one preferred aspect, the pore volume is 0.8 $cm^3$ or less. Accordingly, unity of the catalyst layer is enhanced so that resistance to peeling can be thereby increased with stability. In addition, blow-by of an exhaust gas is suppressed so that contact between the exhaust gas and the catalytic metal can be thereby further increased. Thus, high resistance to peeling and high purification performance can be well balanced.

In one preferred aspect, a ratio of the $Dy$ to the $Dx$ ($Dy/Dx$) is 6 or more and 20 or less. Accordingly, large pores (pores having pore diameters of 30 nm or more) can be suitably formed in the catalyst layer as described above so that purification performance can be further enhanced.

In one preferred aspect, the catalytic metal is supported on the second metal oxide. Accordingly, sintering due to grain growth of the catalytic metal can be significantly suppressed. Thus, purification performance after endurance can be suitably enhanced.

In one preferred aspect, the catalytic metal is not supported by the first metal oxide. Accordingly, sintering due to grain growth of the catalytic metal can be significantly suppressed. Thus, purification performance after endurance can be further enhanced.

In one preferred aspect, when the first metal oxide is 100 parts by mass, a content of the second metal oxide is 50 parts by mass or more and 100 parts by mass or less. Accordingly, large pores (pores having pore diameters of 30 nm or more) can be suitably formed in the catalyst layer as described above so that purification performance can be further enhanced.

In one preferred aspect, the second metal oxide is an Al-containing oxide containing alumina. Accordingly, thermal stability and durability of the catalyst layer can be suitably enhanced.

In one preferred aspect, the first metal oxide is a Ce-containing oxide containing ceria. Accordingly, even when the air-fuel ratio of an exhaust gas varies under traveling conditions of an automobile, for example, high purification performance can be obtained with stability.

In one preferred aspect, the catalyst layer includes an oxidation catalyst as the catalytic metal. Accordingly, the catalyst layer is provided with both resistance to peeling and high HC purification performance, for example.

In one preferred aspect, the catalyst layer includes a first partial catalyst layer formed on a surface of the base material and containing the catalytic metal, and a second partial catalyst layer formed on the first partial catalyst layer and containing the catalytic metal of a type different from the first partial catalyst layer. Accordingly, purification performance can be further enhanced.

In one preferred aspect, the second partial catalyst layer contains Rh as the catalytic metal, and the first partial catalyst layer contains Pd as the catalytic metal. Accordingly, purification performance can be further enhanced.

In one preferred aspect, in the first partial catalyst layer, a pore volume of pores having pore diameters of 30 nm or more measured by a nitrogen adsorption method is 0.23 cm$^3$/g or more. Accordingly, an exhaust gas can be effectively distributed to a deep portion of the catalyst layer, and contact between the catalytic metal included in the first partial catalyst layer and an exhaust gas can be effectively increased.

DESCRIPTION OF PREFERRED EMBODIMENTS

First Embodiment

Figure 1:
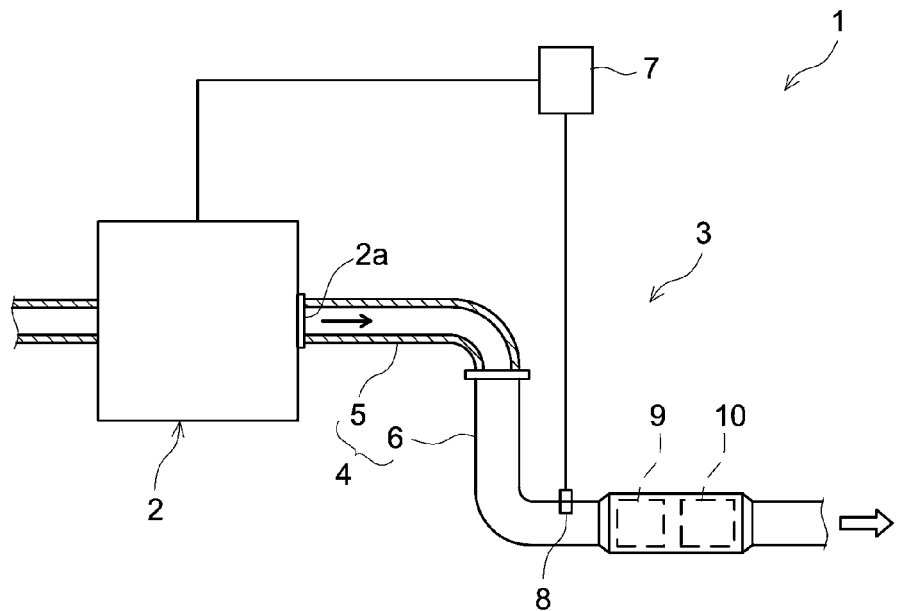
FIG. 1 A schematic view illustrating an exhaust gas purification system according to a first embodiment.

A preferred embodiment of the present invention will be described hereinafter with reference to the drawings. Matters not specifically mentioned in the description but required for carrying out the present invention can be understood as matters of design of a person skilled in the art based on related art in the field. The present invention can be carried out on the basis of the contents disclosed in the description and common general technical knowledge in the field. In the drawings, members and parts having the same functions are denoted by the same reference characters, and description will not be repeated or will be simplified. Dimensional relationships (e.g., length, width, and thickness) in the drawings do not necessarily reflect actual dimensional relationships. The expression "A to B" (where A and B are any numerical values) representing a range herein includes "preferably greater than A" and "preferably less than B" as well as "A or more and B or less."

(Exhaust Gas Purification System)

FIG. 1 is a schematic view of an exhaust gas purification system 1. The exhaust gas purification system 1 includes an internal combustion engine (engine) 2, an exhaust gas purification device 3, and an engine control unit (ECU) 7. The exhaust gas purification system 1 is configured to purify harmful components, such as HC, CO, and NOx, included in an exhaust gas from the internal combustion engine 2 by the exhaust gas purification device 3. It should be noted that arrows in FIG. 1 indicate a flow direction of an exhaust gas. In the following description, a side near the internal combustion engine 2 along the flow of the exhaust gas will be referred to as an upstream side, and a side away from the internal combustion engine 2 will be referred to as a downstream side.

The internal combustion engine 2 herein is mainly constituted by a gasoline engine of a gasoline vehicle. However, the internal combustion engine 2 may be an engine other than a gasoline, for example, a diesel engine or an engine mounted on a hybrid vehicle. The internal combustion engine 2 includes a combustion chamber (not shown). The combustion chamber is connected to a fuel tank (not shown). The fuel tank herein stores gasoline in this embodiment. However, the fuel stored in the fuel tank may be a diesel fuel (light oil), for example. In the combustion chamber, fuel supplied from the fuel tank is mixed with oxygen and is burnt. Accordingly, combustion energy is converted to mechanical energy. The combustion chamber communicates with an exhaust port 2a. The exhaust port 2a communicates with the exhaust gas purification device 3. The burnt fuel gas is emitted to the exhaust gas purification device 3 as an exhaust gas.

The exhaust gas purification device 3 includes an exhaust passage 4 communicating with the internal combustion engine 2, a pressure sensor 8, a first catalyst 9, and a second catalyst 10. The exhaust passage 4 is an exhaust gas passage in which an exhaust gas flows. The exhaust passage 4 herein includes an exhaust manifold 5 and an exhaust pipe 6 in this embodiment. The upstream end of the exhaust manifold 5 is coupled to the exhaust port 2a of the internal combustion engine 2. The downstream end of the exhaust manifold 5 is coupled to the exhaust pipe 6. The first catalyst 9 and the second catalyst 10 are disposed in this order from the upstream side in an intermediate portion of the exhaust pipe 6. The positions of the first catalyst 9 and the second catalyst 10 may be changed in any manner. The numbers of the first catalyst 9 and the second catalyst 10 are not specifically limited, and a plurality of first catalysts 9 and a plurality of second catalysts 10 may be provided. A third catalyst may also be provided downstream of the second catalyst 10.

The first catalyst 9 may be similar to a conventional catalyst, and is not specifically limited. Examples of the first catalyst 9 include: a diesel particulate filter (DPF) that removes PM included in an exhaust gas; a diesel oxidation catalyst (DOC) that purifies HC and CO included in an exhaust gas; a three-way catalyst that purifies HC, CO, and NOx included in an exhaust gas at the same time; and an NOx storage-reduction (NSR) catalyst that stores NOx during normal operation (under a lean condition) and purifies NOx using HC and CO as reducing agents when a large amount of fuel is ejected (under a rich condition). The first catalyst 9 may have the function of increasing the temperature of an exhaust gas that is to flow into the second catalyst 10, for example. It should be noted that the first catalyst 9 is not an essential component, and may be omitted in other embodiments.

The second catalyst 10 has the function of purifying harmful components (e.g., HC) in an exhaust gas. The second catalyst 10 herein is a three-way catalyst in this example. The second catalyst 10 is an example of an exhaust gas purification catalyst disclosed here. The second catalyst 10 will also be referred to as an "exhaust gas purification catalyst" hereinafter. A configuration of the second catalyst (exhaust gas purification catalyst) 10 will be described in detail later.

The ECU 7 controls the internal combustion engine 2 and the exhaust gas purification device 3. The ECU 7 is electrically connected to the internal combustion engine 2 and sensors (e.g., a pressure sensor 8, a temperature sensor, and an oxygen sensor) disposed in parts of the exhaust gas purification device 3. A configuration of the ECU 7 may be similar to a conventional configuration, and is not specifically limited. The ECU 7 is a processor or an integrated circuit, for example. The ECU 7 includes an input port (not shown) and an output port (not shown). The ECU 7 receives, for example, information such as an operating state of a vehicle, the amount of an exhaust gas from the internal combustion engine 2, a temperature, and a pressure. The ECU 7 receives information detected by sensors (e.g., pressure measured by the pressure sensor 8) through the input port. Based on the received information, for example, the ECU 7 transmits a control signal through the output port. The ECU 7 controls operations such as fuel injection control, ignition control, and intake air amount adjustment control of the internal combustion engine 2, for example. Based on the operating state of the internal combustion engine 2 and the amount of an exhaust gas from the internal combustion engine 2, for example, the ECU 7 controls driving and stop of the exhaust gas purification device 3.

(Exhaust Gas Purification Catalyst)

Figure 2:
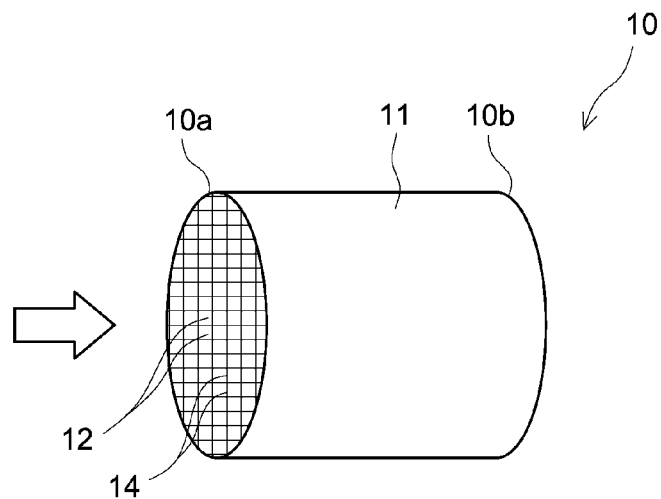
FIG. 2 A perspective view schematically illustrating the exhaust gas purification catalyst in FIG. 1.

FIG. 2 is a perspective view schematically illustrating the exhaust gas purification catalyst 10. It should be noted that the arrow in FIG. 2 indicates a flow direction of an exhaust gas. In FIG. 2, the upstream side of the exhaust passage 4 relatively close to the internal combustion engine 2 is shown at the left, and the downstream side of the exhaust passage relatively far from the internal combustion engine 2 is shown at the right. In FIG. 2, character X denotes cylinder axis directions of the exhaust gas purification catalyst 10. The exhaust gas purification catalyst 10 is disposed in the exhaust passage 4 such that the cylinder axis directions X extend along a flow direction of an exhaust gas. The cylinder axis directions X are along a flow direction of the exhaust gas. In the following description, one direction X1 of the cylinder axis directions X will also be hereinafter referred to as a direction toward the upstream side (also referred to as an exhaust gas inflow side or a front side), and the other direction X2 of the cylinder axis directions X will also be hereinafter referred to as a direction toward the downstream side (also referred to as an exhaust gas outflow side or a rear side). It should be noted that these directions are defined merely for convenience of description, and do not limit to the state of installation of the exhaust gas purification catalyst 10.

Figure 3:
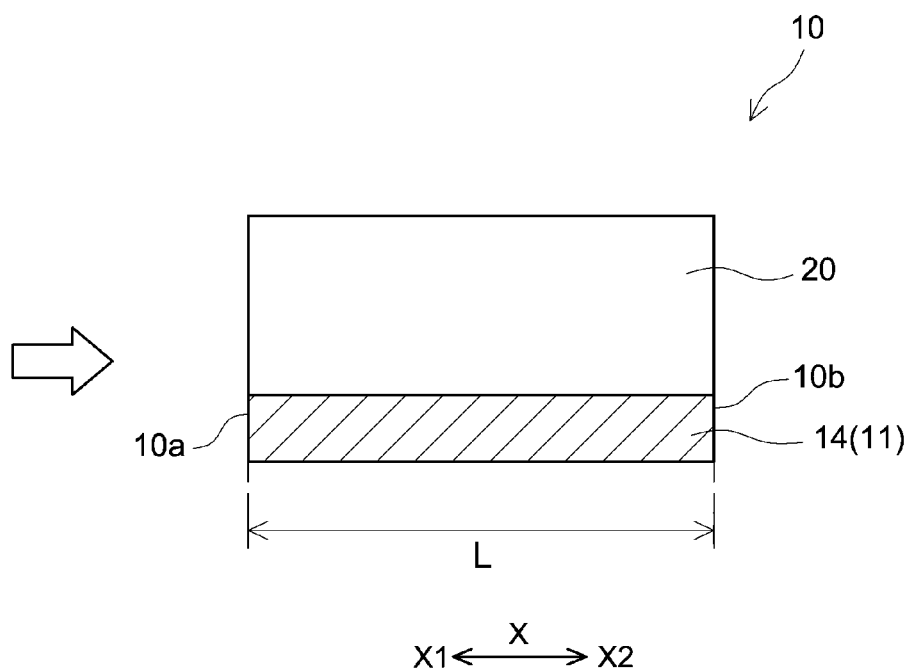
FIG. 3 A partial cross-sectional view of the exhaust gas purification catalyst in FIG. 1 taken along a cylinder axis direction.

The exhaust gas purification catalyst 10 includes a base material 11 having a straight flow structure and a catalyst layer 20 (see FIG. 3). One end of the exhaust gas purification catalyst 10 in the direction X1 is an inlet 10a of an exhaust gas, and the other end in the direction X2 is an outlet 10b of the exhaust gas. The outer shape of the exhaust gas purification catalyst 10 is a cylindrical shape in this embodiment. However, the outer shape of the exhaust gas purification catalyst 10 is not specifically limited, and may be, for example, an oval cylindrical shape, a polygon cylindrical shape, a pipe shape, a foam shape, a pellet shape, or a fiber shape.

The base material 11 constitutes a frame of the exhaust gas purification catalyst 10. The base material 11 is not specifically limited, and may be any material and structure conventionally used for this type of application. The base material 11 may be, for example, a ceramic substrate composed of ceramic such as cordierite, aluminum titanate, or silicon carbide, or may be a metal substrate composed of stainless steel (SUS), a Fe—Cr—Al-based alloy, or a Ni—Cr—Al-based alloy. As illustrated in FIG. 2, the base material 11 has a honeycomb structure in this embodiment. The base material 11 includes a plurality of cells (cavities) 12 regularly arranged along the cylinder axis directions X, and partitions (ribs) 14 partitioning the plurality of cells 12. The volume of the base material 11 (apparent volume including the volume of the cells 12) may be, but is not limited to, approximately 0.1 to 10 L, and 0.5 to 5 L, for example. The average length (overall length) L of the base material 11 along the cylinder axis directions X may be approximately 10 to 500 mm, and 50 to 300 mm, for example.

The cells 12 serve as channels of an exhaust gas. The cells 12 extend along the cylinder axis directions X. The cells 12 are through holes penetrating the base material 11 along the cylinder axis directions X. The shape, size, number, and the like of the cells 12 are designed in consideration of, for example, the flow rate and component of an exhaust gas flowing in the exhaust gas purification catalyst 10. The shape of a cross section of the cells 12 orthogonal to the cylinder axis directions X is not specifically limited. Examples of the cross-sectional shape of each cell 12 include quadrangles such as squares, parallelograms, rectangles, and trapezoids, other polygons (e.g., triangles, hexagons, and octagons), and various geometric shapes such as waveforms and circles. The partitions 14 face the cells 12 and partition adjacent cells 12. The average thickness (dimension orthogonal to the surface, the same hereinafter) of the partitions 14 may be, but is not limited to, approximately 0.1 to 10 mil (where 1 mil is about 25.4 µm), and 0.2 to 5 mil, for example, from the viewpoints of increasing mechanical strength and reducing a pressure loss, and the like.

The catalyst layer 20 is a reaction field for purifying harmful components in an exhaust gas. The catalyst layer 20 is a porous body having a large number of pores (voids). An exhaust gas that has flowed into the exhaust gas purification catalyst 10 is brought into contact with the catalyst layer 20 while flowing in channels (cells 12) in the exhaust gas purification catalyst 10. Accordingly, harmful components in the exhaust gas are purified. For example, HC and CO included in the exhaust gas are oxidized by the catalyst layer 20 and converted to, for example, water and carbon dioxide (purified). For example, NOx included in the exhaust gas is reduced by the catalyst layer 20 and converted to nitrogen (purified).

Figure 4:
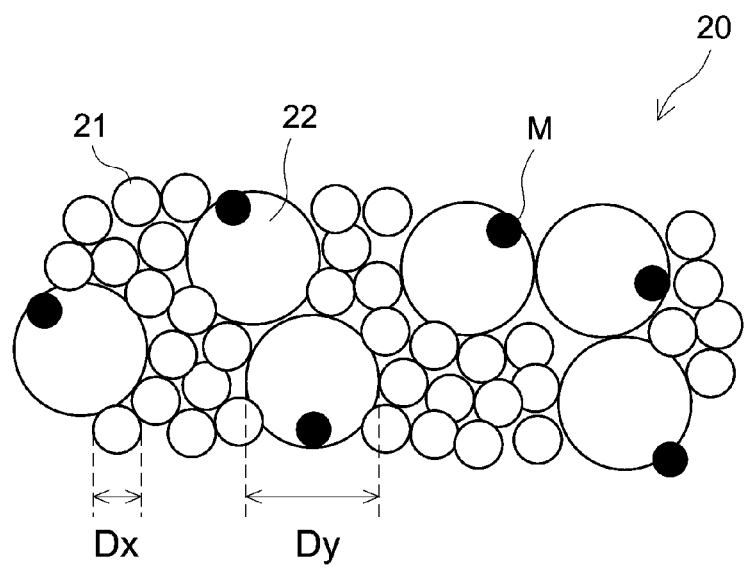
FIG. 4 A schematic view illustrating a structure of a catalyst layer of the exhaust gas purification catalyst in FIG. 1.

FIG. 3 is a partial cross-sectional view schematically illustrating a part of a cross section of the exhaust gas purification catalyst 10 taken along the cylinder axis directions X. The catalyst layer 20 is provided on the base material 11, specifically, on surfaces of the partitions 14, in this embodiment. A part or whole of the catalyst layer 20 may permeate the partitions 14. FIG. 4 is a schematic view illustrating a structure of the catalyst layer 20. As illustrated in FIG. 4, the catalyst layer 20 includes a catalytic metal M, and two types of metal oxides (i.e., a first metal oxide 21 and a second metal oxide having a heat resistance higher than that of the first metal oxide).

As the catalytic metal M, various metal species that can function as oxidation catalysts or reduction catalysts in purification of harmful components may be used. Typical examples of the catalytic metal M include a platinum group, that is, rhodium (Rh), palladium (Pd), platinum (Pt), ruthenium (Ru), osmium (Os), and iridium (Ir). Instead of or in addition to the platinum group, other metal species, such as alkali metals, alkali earth metals, and transition metals, may be used. For example, metal species such as iron (Fe), cobalt (Co), nickel (Ni), copper (Cu), silver (Ag), and gold (Au) may be used. Alternatively, an alloy of two or more of these metals may be used.

From the viewpoint of purifying HC and CO, oxidation catalysts with high oxidation activity (e.g., at least one of Pd and Pt) is preferable. That is, the catalyst layer 20 is preferably an oxidation catalyst layer including an oxidation catalyst (e.g., at least one of Pd and Pt). Accordingly, the catalyst layer 20 is provided with both resistance to peeling and high HC purification performance. The oxidation catalyst layer typically does not include a reduction catalyst (e.g., Rh) with high reduction activity, but may include a reduction catalyst.

The catalytic metal M is preferably used as fine particles having a sufficiently small particle diameter from the viewpoint of increasing a contact area with an exhaust gas, and the like. An average particle diameter (average value of particle diameters obtained by observation with a transmission electron microscope (TEM)) of the catalytic metal M is approximately 1 to 15 nm, and is preferably 10 nm or less, and more preferably 5 nm or less. A supported amount of the catalytic metal M may be approximately 20 g or less, typically 1.5 to 10 g, and for example, 2.5 g to 5.5 g in terms of oxide, per 1 L of the volume of the exhaust gas purification catalyst 10 (volume of the base material 11). By reducing the content of the catalytic metal M, costs can be reduced. The catalytic metal M may be uniformly supported along the cylinder axis directions X, and the supported amount may change stepwise from the upstream side toward the downstream side, for example.

The first and second metal oxides 21 and 22 are inorganic porous bodies. Typical examples of the first and second metal oxides 21 and 22 include: aluminium oxide ($Al_2O_3$, alumina); titanium oxide ($TiO_2$, titania); zirconium oxide ($ZrO_2$, zirconia); silicon oxide ($SiO_2$, silica); rare earth metal oxides such as yttrium oxide ($Y_2O_3$, yttria), lanthanum oxide ($La_2O_3$), cerium oxide ($CeO_2$, ceria), and neodymium oxide ($Nd_2O_3$); alkali earth metal oxides such as magnesium oxide (MgO, magnesia); alkali metal oxides; and solid solutions (composite oxides) of these metal oxides. Examples of the composite oxides include a $La_2O_3$-$Al_2O_3$ composite oxide (LA composite oxide) containing lanthanum oxide and alumina and a $CeO_2$—$ZrO_2$ composite oxide (CZ composite oxide) containing ceria and zirconia.

In this embodiment, the second metal oxide 22 has a heat resistance higher than that of the first metal oxide 21. It should be noted that a heat resistance of a metal oxide can be obtained by comparing the degrees of decrease of a specific surface area after exposure at a specific temperature (e.g., 1000° C.) for a predetermined time (e.g., the same time as that in a durability test described later). That is, a metal oxide showing a smaller degree of decrease of the specific surface area is defined as a metal oxide having a relatively higher heat resistance. In some aspects, the first and second metal oxides 21 and 22 have different compositions. In this case, between the first and second metal oxides 21 and 22, the types of metal oxides each serving as a main component (component occupying the largest proportion in mass ratio; preferably a component occupying 50 mass % or more) may be different. For example, the first metal oxide 21 may include zirconia as a main component, and the second metal oxide 22 may include alumina as a main component.

In some aspects, the first metal oxide 21 is an OSC material having an oxygen storage capacity. Accordingly, even when the air-fuel ratio of an exhaust gas varies under traveling conditions of an automobile, for example, high purification performance can be obtained with stability. In this case, the second metal oxide 22 may be a non-OSC material having no oxygen storage capacity. The first metal oxide 21 may be, for example, a metal oxide containing no alumina with high heat resistance and durability (non-Al oxide). The first metal oxide 21 may be a metal oxide containing ceria having high oxygen storage capacity (Ce-containing oxide). The Ce-containing oxide may be ceria or a composite oxide containing ceria and a metal oxide other than ceria.

From the viewpoint of increasing heat resistance and durability, for example, the Ce-containing oxide is preferably a composite oxide including at least one of Zr and Al, for example, a $CeO_2$—$ZrO_2$ composite oxide (CZ composite oxide). From the viewpoint of increasing heat resistance, for example, the CZ composite oxide may further include a rare earth metal oxide such as $Nd_2O_3$, $La_2O_3$, $Y_2O_3$, and $Pr_6O_{10}$. The CZ composite oxide may be Ce-rich or Zr-rich. In the CZ composite oxide, a mixing ratio of ceria is approximately 1 to 60 mass %, typically 5 to 50 mass %, preferably 10 to 45 mass %, and may be 15 to 30 mass %, for example, where the entire composite oxide is 100 mass %. When the mixing ratio of ceria is a predetermined value or more, oxygen storage capacity increases. When the mixing ratio of the ceria mixing ratio is a predetermined value or less, heat resistance increases. When the mixing ratio is within the range described above, high levels of both oxygen storage capacity and heat resistance can be obtained.

In some aspects, the second metal oxide 22 is a metal oxide containing alumina having high heat resistance and high durability (Al-containing oxide). The Al-containing oxide may be alumina or a composite oxide containing alumina and a metal oxide other than alumina (e.g., rare earth metal oxide). Alumina generally has higher heat resistance than other metal oxides conventionally used for applications of this type. Thus, thermal stability and durability of the catalyst layer 20 can be suitably enhanced. The second metal oxide 22 may be, for example, a metal oxide containing no ceria having low heat resistance (non-Ce oxide).

From the viewpoint of increasing heat resistance and durability, for example, the Al-containing oxide is preferably a composite oxide containing a rare earth metal oxide, such as a $La_2O_3$-$Al_2O_3$ composite oxide (LA composite oxide). The LA composite oxide may be La rich or Al rich. In the LA composite oxide, a mixing ratio of the metal oxide other than alumina is approximately less than 50 mass %, typically 0.1 to 20 mass %, and may be, for example, 1 to 10 mass % where the entire composite oxide is 100 mass %, from the viewpoint of suppressing degradation over time with use, for example.

In FIG. 4, the catalytic metal M is supported by the second metal oxide 22. The second metal oxide 22 is a support material supporting the catalytic metal M. In FIG. 4, the catalytic metal M is not supported by the first metal oxide 21. The first metal oxide 21 is a non-support material (promoter) not supporting the catalytic metal M. In this manner, the catalytic metal M is supported only by the second metal oxide 22 having relatively high heat resistance so that sintering due to grain growth of the catalytic metal M can be significantly suppressed. Thus, advantages of the technique disclosed here can be exhibited in high levels. It should be noted that the catalytic metal M may be supported by each of the first metal oxide 21 and the second metal oxide 22 or the catalytic metal M may be supported only by the second metal oxide 22 in other embodiments.

The first and second metal oxides 21 and 22 are in a powder state (particulate). When the compositions thereof are the same, as an average particle diameter of a metal oxide increases, heat resistance of the metal oxide tends to increase. Thus, in FIG. 4, an average particle diameter Dy of the second metal oxide 22 is larger than an average particle diameter Dx of the first metal oxide 21. That is, Dx<Dy.

An "average particle diameter" in the catalyst layer 20 herein refers to a median particle diameter corresponding to cumulative 50% from a small particle diameter side in area-based circle equivalent frequency distribution obtained by observing an arbitrary cross section of the catalyst layer 20 with a surface observation device and analyzing the obtained image with image processing software. For example, the average particle diameter is a median particle diameter corresponding to cumulative 50% from a small particle diameter side in area-based circle equivalent frequency distribution obtained by observing an arbitrary cross section of the catalyst layer 20 with an electron probe micro analyzer (EPMA) and analyzing the obtained compositional (COMPO) image with image processing software Image J. A specific method of calculating the average particle diameter will be described in examples later.

In this embodiment, the average particle diameter Dy of the second metal oxide 22 is 7 μm or more. Since the average particle diameter Dy is a predetermined value or more, large pores (pores having pore diameters of 30 nm or more) considered to be effective for gas diffusion can be suitably formed in the catalyst layer 20. In addition, the catalyst layer 20 can be provided with high durability and high heat resistance. Accordingly, resistance to peeling of the catalyst layer 20 can be increased, and peeling of the catalyst layer 20 can be suppressed. In addition, coarsening of metal oxides due to thermal degradation or a neck phenomenon can be suppressed, and sintering due to grain growth of a catalytic metal M can be suppressed. Thus, high purification performance can be obtained over a long period.

The average particle diameter Dy of the second metal oxide 22 is preferably 7.5 μm or more, for example, 8.0 μm or more, and 8.5 μm or more, and is preferably approximately 50 μm or less, typically 40 μm or less, 30 μm or less, for example, 20 μm or less, 15 μm or less, 12 μm or less, and 11 μm or less. Since the average particle diameter Dy of the second metal oxide 22 is within the range described above, diffusion channels of an exhaust gas can be suitably obtained in the catalyst layer 20 so that contact between the exhaust gas and the catalytic metal M is increased, and sintering due to grain growth of the catalytic metal M can be significantly suppressed. Thus, advantages of the technique disclosed here can be exhibited in high levels.

In FIG. 4, the average particle diameter Dx of the first metal oxide 21 is significantly different from the average particle diameter Dy of the second metal oxide 22. In this embodiment, a ratio of the average particle diameter Dy of the second metal oxide 22 to the average particle diameter Dx of the first metal oxide 21 (Dy/Dx) is 5 or more. The ratio (Dy/Dx) is, but not specifically limited to, typically 5.5 or more, preferably 6 or more, for example, 6.5 or more, and 7 or more, and approximately 30 or less, typically 25 or less, preferably 20 or less, 18 or less, for example, 15 or less, and 10 or less. Since the ratio (Dy/Dx) is within the range described above, it is possible to prevent the catalyst layer 20 from becoming excessively dense, and large pores (pores having pore diameters of 30 nm or more) considered to be effective for gas diffusion can be suitably formed in the catalyst layer 20. Accordingly, an exhaust gas can be widely diffused in the catalyst layer. It is also possible to prevent the catalyst layer 20 from becoming excessively sparse so that a contact area between the metal oxides can be enlarged. Accordingly, resistance to peeling of the catalyst layer 20 can be increased. In addition, since the catalyst layer 20 has a most densely packed structure, the thickness of the catalyst layer 20 decreases so that a pressure loss can be reduced. Thus, advantages of the technique disclosed here can be exhibited in high levels.

The average particle diameter Dx of the first metal oxide 21 is, but not specifically limited to, approximately 0.1 μm or more, preferably 0.2 μm or more, 0.5 μm or more, 0.7 μm or more, and, for example, 1 μm or more, and approximately 5 μm or less, typically 3 μm or less, preferably 2 μm or less, for example, 1.5 μm or less, and 1.4 μm or less. Since the average particle diameter Dx of the first metal oxide 21 is within the range described above, high levels of gas diffusibility and resistance to peeling of the catalyst layer 20 can be well balanced.

In the catalyst layer 20, for example, the first metal oxide 21 may be a main component or the second metal oxide 22 may be a main component. In the catalyst layer 20, when the first metal oxide 21 is 100 parts by mass, a content of the second metal oxide 22 is, but not specifically limited to, approximately 5 parts by mass or more, typically 10 parts by mass or more, preferably 50 parts by mass or more, 55 parts by mass or more, for example, 60 parts by mass or more, and 70 parts by mass or more, and approximately 500 parts by mass or less, typically 300 parts by mass or less, preferably 200 parts by mass or less, 100 parts by mass or less, and, for example, 80 parts by mass or less. Since the content of the second metal oxide 22 is within the range described above, large pores (pores having pore diameters of 30 nm or more) considered to be effective for gas diffusion can be suitably formed in the catalyst layer 20. In addition, high levels of gas diffusibility and resistance to peeling of the catalyst layer 20 can be well balanced. Thus, advantages of the technique disclosed here can be exhibited in high levels.

The catalyst layer 20 may consist of the catalytic metal M, the first metal oxide 21, and the second metal oxide 22, and may further include optional components depending on applications, for example. For example, in a case where the catalyst layer 20 includes an oxidation catalyst and an OSC material, for example, the catalyst layer 20 preferably includes an alkaline earth element such as calcium (Ca) or barium (Ba). Accordingly, in a lean atmosphere in which the fuel is thinner than the stoichiometric air-fuel ratio (oxygen-rich atmosphere), the amount oxygen absorption to the OSC material can be further increased. In addition, poisoning of the oxidation catalyst is suitably suppressed so that catalyst activity can be enhanced. Furthermore, dispersibility of the oxidation catalyst is increased so that sintering of the oxidation catalyst can be suitably suppressed. The alkaline earth element can be present in the form of an oxide in the catalyst layer 20.

As another example, the catalyst layer 20 may include an NOx adsorbent having NOx storage capacity and a stabilizer, and the like. Examples of the stabilizer include rare-earth elements such as yttrium (Y), lanthanum (La), and neodymium (Nd). The rare-earth element can be present in the form of an oxide in the catalyst layer 20.

In this embodiment, the catalyst layer 20 is porous, and contains a plurality of pores therein. A pore volume of pores having pore diameters of 30 nm or more measured by a nitrogen adsorption method is 0.28 $cm^3$ or more per 1 g of the catalyst layer 20. Accordingly, an exhaust gas can be widely diffused in the catalyst layer so that contact between the exhaust gas and the catalytic metal can be increased. In addition, resistance to peeling of the catalyst layer 20 can be increased.

From the viewpoint of further enhancing diffusibility of an exhaust gas, for example, the pore volume of pores having pore diameters of 30 nm or more is preferably 0.29 $cm^3$ or more, and 0.3 $cm^3$ or more, per 1 g of the catalyst layer 20. The upper limit of the pore volume of pores having pore diameters of 30 nm or more is, but not specifically limited, approximately 1 $cm^3$ or less, preferably 0.8 $cm^3$ or less, 0.5 $cm^3$ or less, 0.4 $cm^3$ or less, and may be 0.35 $cm^3$ or less, for example, per 1 g of the catalyst layer 20, from the viewpoints of increasing resistance to peeling with stability and suppressing blow-by of an exhaust gas, for example. In the catalyst layer 20, the pore volume of pores having pore diameters of 30 to 50 nm may be 0.28 $cm^3$ or more, 0.29 $cm^3$ or more, and 0.3 $cm^3$ or more per 1 g of the catalyst layer 20.

The "pore volume of pores having pore diameters of 30 nm or more" herein refers to a cumulative area of regions where the pore diameter is 30 nm or more in a graph having an abscissa representing a pore diameter ($\mu m$) measured by a nitrogen adsorption method and an ordinate representing a pore volume ($cm^3/g$) per a unit mass. The measurement by the nitrogen adsorption method can employ a commercially available gas adsorption amount measurement device.

The catalyst layer 20 preferably has high resistance to peeling. In the exhaust gas purification catalyst 10 in an unused state, for example, the peeling rate is preferably approximately 3% or less, preferably 2% or less, and more preferably 1% or less. In the exhaust gas purification catalyst 10 after a predetermined durability test, the peeling rate is preferably approximately 4% or less, preferably 3% or less, and more preferably 2.5% or less. A specific evaluation method of the peeling rate will be described in examples below.

A coating amount (formed amount) of the catalyst layer 20 may be, but is not specifically limited to, approximately 30 g or more, typically 50 g or more, preferably 70 g or more, and, for example, 100 g or more, and may be approximately 500 g or less, typically 300 g or less, preferably 200 g or less, and, for example, 150 g or less, per 1 L of the volume of the exhaust gas purification catalyst 10 (volume of the base material 11). When the coating amount satisfies the range described above, high levels of both enhancement of purification performance and reduction of a pressure loss can be well balanced. It should be noted that the "coating amount" herein refers to a mass of a solid content included in a unit volume of the exhaust gas purification catalyst 10.

The length and thickness of the catalyst layer 20 may be designed in consideration of, for example, the size of the cells 12 of the base material 11 and a flow rate of an exhaust gas flowing in the exhaust gas purification catalyst 10. The catalyst layer 20 may be provided on the partitions 14 of the base material 11 continuously or intermittently. The catalyst layer 20 may be provided along the cylinder axis directions X from the inlet 10a of an exhaust gas or along the cylinder axis directions X from the outlet 10b of the exhaust gas, for example. A coating width (average length) of the entire catalyst layer 20 along the cylinder axis directions X is preferably, but not specifically limited to, approximately 20% or more, preferably 50% or more, typically 80% or more, and, for example, 90% or more of an overall length L of the base material 11, and may be substantially equal to the overall length L of the base material 11. A coating thickness (average thickness) of the catalyst layer 20 is, but not specifically limited to, approximately 1 to 300 $\mu m$, typically 5 to 200 $\mu m$, and, for example, 10 to 100 $\mu m$. Accordingly, high levels of enhancement of purification performance and reduction of a pressure loss can be well balanced.

The catalyst layer 20 may have a single-layer structure as illustrated in FIG. 3, for example, or may be constituted by a plurality of (two or more) partial catalyst layers having different compositions and properties. For example, in another embodiment, the catalyst layer 20 may have a structure in which above and/or below one partial catalyst layer, another partial catalyst layer (e.g., including a catalytic metal M of a different type) is provided and the partial catalyst layers of two or more types are stacked in the thickness direction. In yet another embodiment, the catalyst layer 20 may have a structure in which head of and/or behind one partial catalyst layer along the cylinder axis directions X, another partial catalyst layer (e.g., including a catalytic metal M of a different type) is provided. The exhaust gas purification catalyst 10 may include a layer other than a catalyst layer, for example, a layer including no catalytic metal M.

(Method for Producing Exhaust Gas Purification Catalyst 10)

The exhaust gas purification catalyst 10 can be produced by, for example, the following method: Specifically, first, a base material 11 and a catalyst layer slurry for forming a catalyst layer 20 are prepared. The catalyst layer slurry preferably includes, as essential components, a catalytic metal source (e.g., solution containing a catalytic metal M as ions) and the two types of metal oxides described above (i.e., the first and second metal oxides 21 and 22), and is prepared by diffusing other optional components, such as a binder and additives, therewith in a dispersion medium. As the binder, alumina sol or silica sol, for example, can be used. As the dispersion medium, water or an aqueous solvent, for example, can be used. Properties of the slurry, such as viscosity and a solid content proportion, may be adjusted as appropriate depending on the size of the base material 11 to be used, the state of the cells 12 (partitions 14), and required properties for the catalyst layer 20, and the like.

The average particle diameter Da of the first metal oxide 21 used for the catalyst layer slurry is preferably adjusted beforehand by, for example, known wet grinding or dry grinding. The first metal oxide 21 is preferably adjusted beforehand such that the first metal oxide 21 in a row material state has an average particle diameter Da of approximately 0.01 µm or more, preferably 0.05 µm or more, for example, 0.1 µm or more, 0.2 µm or more, and 0.5 µm or more, and approximately 5 µm or less, preferably 3 µm or less, for example, 2 µm or less, 1.5 µm or less, and 1 µm or less. The "average particle diameter" in the catalyst layer slurry refers to a D50 particle diameter (volume sphere equivalent diameter) corresponding to cumulative 50% from a small particle diameter side in volume-based particle diameter distribution measured by a laser diffraction/scattering method.

On the other hand, the second metal oxide 22 used for the catalyst layer slurry is preferably pulverized as less as possible from the viewpoint of making use of pores in a raw material without the pores being crushed, for example. An average particle diameter Db of the second metal oxide 22 in a raw material state is typically larger than the average particle diameter Da of the first metal oxide 21, approximately 5 µm or more, preferably 7 µm or more, for example, 10 µm or more and approximately 50 µm or less, preferably 40 µm or less, and for example, 30 µm or less. A ratio of the average particle diameter Db of the second metal oxide 22 to the average particle diameter Da of the first metal oxide 21 (Db/Da) preferably exceeds 1, and is approximately 2 or more, preferably 3 or more, for example, 5 or more, 10 or more, and approximately 50 or less, 40 or less, preferably 30 or less, and, for example, 20 or less. Accordingly, a large number of large pores having pore diameters of 30 nm or more can be formed in the catalyst layer 20, and the structure of the catalyst layer 20 after firing, for example, (1) the average particle diameter Dy of the second metal oxide 22 is 7 µm or more; and (2) the pore volume of pores having pore diameters of 30 nm or more is 0.28 cm$^3$/g or more can be suitably obtained.

The catalyst layer 20 can be formed by a conventional method, such as an impregnation method or a wash coating method. As an example, the prepared catalyst layer slurry is allowed to flow into the cells 12 from an end portion of the base material 11 to a predetermined length along the cylinder axis directions X. The slurry may be allowed to flow in any one of the inlet 10a or the outlet 10b. In this case, excess slurry may be sucked from the opposite end. Alternatively, the excess slurry may be discharged from the cell 12 by, for example, sending air from the opposite end. Next, the base material 11 to which the slurry has been supplied is fired at a predetermined temperature in a predetermined time. The firing method may be performed in the same manner as conventional firing. Accordingly, the raw material component is calcined to the base material 11 so that a porous catalyst layer 20 is thereby formed. In the foregoing manner, the exhaust gas purification catalyst 10 can be obtained.

(Application of Exhaust Gas Purification Catalyst 10)

The exhaust gas purification catalyst 10 is preferably applied to purification of an exhaust gas emitted from internal combustion engines in marine products such as ships, tankers, water bikes, personal watercrafts, and outboard engine; gardening products such as grass mowers, chain saws, and trimmers; leisure products such as golf carts and four-wheeled buggies; power generation facilities such as cogeneration systems; refuse incinerators, as well as vehicles such as automobiles and trucks, motorcycles, and motor scooters. Among these applications, the exhaust gas purification catalyst 10 is especially preferably applied to vehicles such as automobiles.

Second Embodiment

Figure 5:
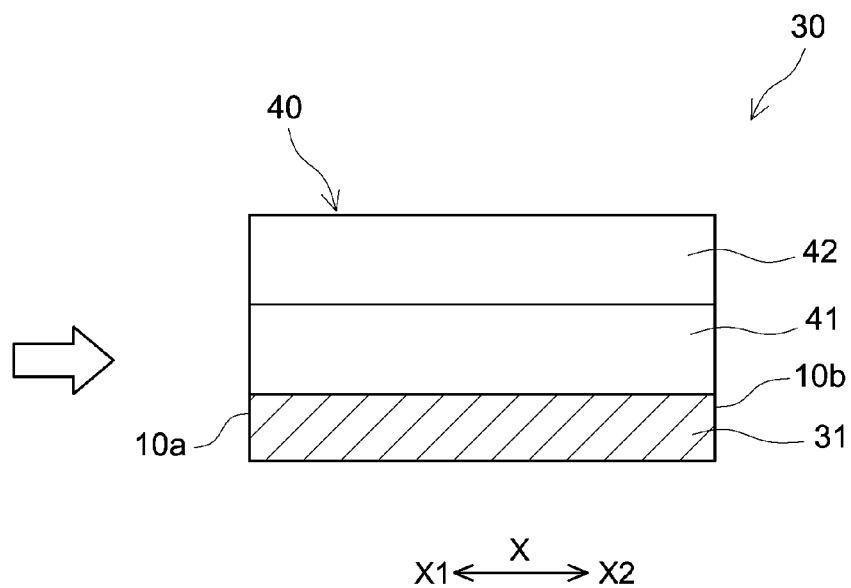
FIG. 5 A cross-sectional view schematically illustrating a catalyst layer according to a second embodiment.

FIG. 5 is a partial cross-sectional view schematically illustrating a part of a cross section of an exhaust gas purification catalyst 30 taken along cylinder axis directions X. The exhaust gas purification catalyst 30 includes a base material 31 and a catalyst layer 40 disposed on the base material 31 and having a multi-layer structure. The base material 31 may be similar to the base material 11 according to the first embodiment described above. In the following description, description of components common to those of the first embodiment will be omitted or simplified, and components different from those of the first embodiment will be mainly described.

The catalyst layer 40 has a laminated structure in which two partial catalyst layers 41 and 42 are stacked in the thickness direction. Specifically, the catalyst layer 40 is composed of two layers: a partial catalyst layer (lower layer) 41 in contact with a surface of the base material 31; and a partial catalyst layer (upper layer) 42 disposed on a surface of the lower layer 41. The lower layer 41 is an example of a first partial catalyst layer, and the upper layer 42 is an example of a second partial catalyst layer. In this embodiment, the upper layer 42 constitutes a surface-layer portion of the catalyst layer 40. However, in the thickness direction (stacked direction) of the catalyst layer 40, one or more layers may be additionally provided on a surface of the upper layer 42, between the lower layer 41 and the upper layer 42, or between the base material 31 and the lower layer 41, for example.

Each of the lower layer 41 and the upper layer 42 typically includes a catalytic metal M and at least one type of a metal oxide supporting the catalytic metal M. Each of the lower layer 41 and the upper layer 42 may include the catalytic metal M and the above-described two types of metal oxides, that is, first and second metal oxides 21 and 22. The lower layer 41 and the upper layer 42 may have different compositions. For example, at least one of the types of the catalytic metals M and the types of the metal oxides supporting the catalytic metals M may be different.

In some aspects, the lower layer 41 and the upper layer 42 may include catalytic metals M of different types. In some aspects, the lower layer 41 may include an oxidation catalyst (e.g., at least one of Pd and Pt) as the catalytic metal M. In some aspects, the upper layer 42 may include a reduction catalyst (e.g., Rh) as the catalytic metal M. For example, the lower layer 41 may include Pd and the upper layer 42 may include Rh. The oxidation catalyst and the reduction catalyst are separated in the thickness direction and supported so that degradation of the catalytic metals M (e.g., sintering due to grain growth) can be thereby significantly suppressed and purification performance after endurance can be further enhanced. However, the oxidation catalyst and the reduction catalyst may be present in the same layer. For example, each of the lower layer 41 and the upper layer 42 may include the oxidation catalyst and the reduction catalyst.

In some aspects, at least the lower layer 41 satisfies the structure of the catalyst layer 20 according to the first embodiment described above. For example, only the lower layer 41 may satisfy the structure of the catalyst layer 20 according to the first embodiment, or each of the lower layer 41 and the upper layer 42 may satisfy the structure of the catalyst layer 20 according to the first embodiment. Accordingly, even in a case where the catalyst layer and the base material have different thermal expansion coefficients, for example, peeling of the catalyst layer from the base material by thermal hysteresis can be suitably suppressed.

In some aspects, in the lower layer 41, the pore volume of pores whose pore diameters measured by a nitrogen adsorption method are 30 nm or more may be approximately 0.2 $cm^3$ or more, preferably 0.23 $cm^3$ or more, for example, 0.25 $cm^3$ or more, and 0.3 $cm^3$ or more, and approximately 1 $cm^3$ or less, preferably 0.8 $cm^3$ or less, 0.5 $cm^3$ or less, 0.4 $cm^3$ or less, and, for example, 0.39 $cm^3$ or less, per 1 g of the lower layer 41. Accordingly, an exhaust gas can be effectively distributed to a deep portion (lower layer 41) of the catalyst layer 20, and contact between the catalytic metal and the exhaust gas in the lower layer 41 can be increased. In this manner, the catalytic metal M can be effectively used.

In the manner described above, in the exhaust gas purification catalysts 10 and 30, preferable voids considered to be effective for gas diffusion are obtained in the catalyst layers 20 and 40, and heat resistance of the catalyst layers 20 and 40 is increased. Accordingly, the structure described above can increase contact between an exhaust gas and the catalytic metal M, and even in a high SV environment with a large displacement, for example, high purification performance can be obtained. In addition, it is possible to suppress degradation (e.g., sintering due to grain growth) of the catalytic metal M even after repeated use, and peeling of the catalyst layer can be suppressed. Thus, the exhaust gas purification catalysts 10 and 30 have both high resistance to peeling and high purification performance, and the high purification performance can be retained for a long period.

Test examples of the present invention will be described below, but are not intended to limit the present invention.

Test Example 1

Study in Single Layer

Example 1

In this embodiment, a catalyst layer slurry (slurry 1) of one type was prepared, and a catalyst layer with a single-layer structure was formed on a base material. Specifically, first, a honeycomb base material (made of cordierite, volume: 0.9 L, overall length of base material: 105 mm, the number of cells: 600 cells, cell shape: hexagon, partition thickness: 2 mil) was prepared.

In the following description, "L-cat" refers to a solid content per 1 L of the volume of an exhaust gas purification catalyst (volume of a base material).

Next, the following two types of metal oxides were prepared.

First Metal Oxide: OSC Material (Ce-Containing Oxide) $CeO_2$—$ZrO_2$-based composite oxide, a $CeO_2$=15 to 30 mass %, a small amount of one of $Nd_2O_3$, $La_2O_3$, $Y_2O_3$, and $Pr_6O_{11}$ was added, and processed to have high heat resistance.

Second metal oxide (average particle diameter Db=30 μm): Al-containing oxide $La_2O_3$-$Al_2O_3$ composite oxide, $La_2O_3$=1 to 10 mass %

Next, a Pd nitrate solution, a first metal oxide, barium sulfate, and an $Al_2O_3$-based binder were dispersed in a water medium and wet ground, thereby adjusting the average particle diameter Da of the first metal oxide to about 1 μm. Then, the second metal oxide (average particle diameter Db=15 μm) was added thereto, thereby preparing slurry 1.

The average particle diameters Da and Db were D50 particle diameters on a material basis in the slurry, and were measured by using a laser diffraction/scattering particle diameter distribution measurement device LA-960 manufactured by HORIBA. Thus, the average particle diameters Da and Db can be different from average particle diameters Dx and Dy calculated from image analysis of an EPMA described later.

Subsequently, the slurry 1 was poured from an end portion of the honeycomb base material and an unnecessary portion of the slurry 1 was blown out by a blower, thereby coating a portion corresponding to 100% of the entire partition length with a material. It should be noted that the coating was performed such that the material contains 0.7 g/L-cat of Pd, 55 g/L-cat of the first metal oxide, 40 g/L-cat of the second metal oxide, and 5 g/L-cat of Ba. Then, a moisture content was evaporated through heating and drying for two hours with a dryer at 120° C., and then the dried product was fired for two hours with an electric heating furnace at 500° C. In this manner, an exhaust gas purification catalyst of Example 1 in which a catalyst layer having a single-layer structure was formed on a surface of the base material to a thickness of 100 μm or less was obtained.

Example 2

In Example 2, an exhaust gas purification catalyst was obtained in the same manner as that of Example 1 except that a second metal oxide having an average particle diameter Db of 5.5 μm was used.

Example 3

In Example 3, an exhaust gas purification catalyst was obtained in the same manner as that of Example 1 except that a second metal oxide having an average particle diameter Db of 6.7 μm was used.

Example 4

In Example 4, an exhaust gas purification catalyst was obtained in the same manner as that of Example 1 except that a second metal oxide having an average particle diameter Db of 6.9 μm was used and wet grinding was performed such that a first metal oxide had an average particle diameter Da of 2 μm.

Comparative Example 1

In Comparative Example 1, an exhaust gas purification catalyst was obtained in the same manner as that of Example 1 except that a Pd nitrate solution, a first metal oxide, a second metal oxide, barium sulfate, and an $Al_2O_3$-based binder were dispersed together in a water medium and wet ground, thereby adjusting the average particle diameter Da of the first metal oxide and the average particle diameter Db of the second metal oxide to each about 5 μm.

[Measurement of Average Particle Diameters Dx and Dy of Metal Oxides]

First, the exhaust gas purification catalyst prepared as described above was cut along the cylinder axis directions, thereby obtaining a test piece. Next, a cross section of the catalyst layer was observed with a field emission electron probe micro analyzer (FE-EPMA) JXA-8500F manufactured by JEOL so that a COMPO image was acquired. The image acquisition conditions were an accelerating voltage: 20 kV, an irradiation current: 100 nA, a dwell time: 30 ms, and the number of pixels: 256×256.

Then, the obtained COMPO image was taken in open-source image analysis software Image J so that an image analysis was conducted according to a procedure described below, and average particle diameters Dx and Dy of the first metal oxide and the second metal oxide were measured. Table 1 shows results.

(1) Open a file of a COMPO image.
(2) Draw a line along a scale bar.
(3) Match pixels and a length (μm) by Set Scale.
(4) Cut out an image of a catalyst layer portion of an analysis target.
(6) Binarize luminance automatically by Threshold of Adjust. In this manner, segmentation was automatically performed on each of the first metal oxide and the second metal oxide, and the second metal oxide was segmented (classified) to white, and the first metal oxide was segmented (classified) to black.
(7) Perform fine adjustment, such as manually remove voids, on the first metal oxide (black) portion. Then, the following steps (8) to (14) were conducted on each of the first metal oxide and the second metal oxide.
(8) Divide connected particles automatically by Watershed.
(9) Obtain an area of each divided particle by Analyze particles. Calculation was performed including hollow particles and excluding particles at ends of the image in an analysis range of 0 to infinity (μm$^2$) with a circularity of 0 to 1.0.
(10) Display area frequency distribution by Distribution. The display range was 0.005 to 30000 (μm$^2$), and the number of bins was 7,200,000.
(11) Convert the obtained area frequency distribution to a particle diameter (diameter) by perfect circle approximation.
(12) Cumulate an area from the particle diameter and calculate an area fraction of each particle diameter as an area frequency.
(13) Create area frequency distribution in which the particle diameter and the area frequency were plotted, and use a point corresponding to cumulative 50% of integration of the area frequency from a small particle diameter side as an average particle diameter (area basis).

[Measurement of Pore Volume of Catalyst Layer]

The catalyst layer was scraped from the exhaust gas purification catalyst, and measurement was performed with a gas adsorption amount measurement device BELSORP MAX II manufactured by MicrotracBEL Corp. to obtain a nitrogen adsorption-desorption isotherm. The measurement was performed at room temperature after a vacuum pretreatment conducted on a specimen by evacuation at 350° C. for three hours. Then, from the nitrogen adsorption-desorption isotherm, a total pore volume with pore diameters of 30 nm or more was obtained. The analysis method was a Barrett-Joyner-Halenda (BJH) method. It should be noted that this measurement device can evaluate pores of approximately 0.35 to 500 nm. Table 1 shows results.

[Evaluation of HC Purification Performance]

The exhaust gas purification catalyst of each example was attached to an exhaust system of a gasoline engine of V-type 8-cylinder type (displacement: 4600 cc). Then, a durability test was conducted in such a manner that the engine was driven at average engine revolutions of 3000 rpm, and an exhaust gas in a stoichiometric atmosphere and an exhaust gas in a lean atmosphere (atmosphere with excess oxygen over a stoichiometric air-fuel ratio) were alternately distributed at a predetermined interval to the exhaust gas purification catalyst at a catalyst bed temperature of 1000° C. for 46 hours.

After the durability test, HC purification performance of the exhaust gas purification catalyst of each example was evaluated by using a catalyst evaluation device including a gasoline engine. Specifically, the exhaust gas purification catalyst of each example was placed in a catalyst evaluation device, and while a simulation exhaust gas with an air-fuel ratio (A/F) of 14.6 was supplied at average engine revolutions of 3000 rpm, temperature rise characteristics (temperature rise speed: 20° C./min) from room temperature (25° C.) to 500° C. was measured at Ga (inflow air volume into the engine) of 26.5 g/s. From a ratio of an HC concentration of an inflow gas into the exhaust gas purification catalyst and an HC concentration of an outflow gas from the exhaust gas purification catalyst at this time, an HC purification rate was measured. Then, a temperature at which the HC purification rate was 50% (HC-T50) was obtained. Table 1 shows results.

[Evaluation of Peeling Rate]

Each of the exhaust gas purification catalysts before and after the durability test in each example was cut into a cube of 18 mm×18 mm×18 mm, thereby obtaining a measurement sample. This measurement sample was placed in a porcelain crucible, and subjected to a heat treatment at 1050° C. for five hours in the air. A mass of a catalyst layer peeled off and dropped into the crucible in the heat treatment was weighed, and recorded as "mass 1." A mass of the measurement sample after the heat treatment was also weighed, and recorded as a mass before vibration application described later (mass 2).

Then, the measurement sample after the heat treatment was hooked on a jig obtained by bending a front end of a wire, and was hung in a cleaning tank of an ultrasonic cleaner, and ultrasonic waves with a frequency of 40 to 45 kHz at a sound pressure of 10 to 12 mV were applied for 10 minutes. The measurement sample after the ultrasonic application was collected, and weighed after being dried at 180° C. for one hour or more, thereby examining a mass of the measurement sample after the vibration application (mass 3). Thereafter, by using the mass 1, the mass 2, and the mass 3, a peeling rate of the catalyst layer was calculated by (Equation 1) below. This evaluation was performed with N=2 in each example, and an average value was calculated. The obtained results are shown in Table 1. A smaller peeling rate shows a smaller degree of peeling and higher resistance to peeling.

Peeling rate (%)=[{(mass 1+mass 2)−mass 3}÷(mass 1+mass 2)]×100          (Equation 1)

TABLE 1

Study in Single Layer

| | Catalyst layer | | | | Evaluation result | | |
|---|---|---|---|---|---|---|---|
| | Second metal oxide (Al-containing oxide) | First metal oxide (OSC material) | | pore capacity of pore | HC-T50 | Peeling rate | |
| | Dy [μm] | Dx [μm] | Dy/Dx | diameter ≥30 nm [cm³/g] | [° C.] | Initial [%] | After endurance [%] |
| Example 1 | 11 | 1.1 | 10.0 | 0.28 | 416 | 0.39 | 0.22 |
| Example 2 | 7.5 | 1.1 | 6.8 | 0.30 | 385 | 0.42 | 0.42 |
| Example 3 | 8.5 | 1.1 | 7.7 | 0.31 | 393 | 0.46 | 0.27 |
| Example 4 | 8.5 | 1.4 | 6.1 | 0.30 | 397 | 0.36 | 0.20 |
| Comparative Example 1 | 5.3 | 4.2 | 1.3 | 0.21 | 425 | 0.67 | 0.63 |

Figure 6:
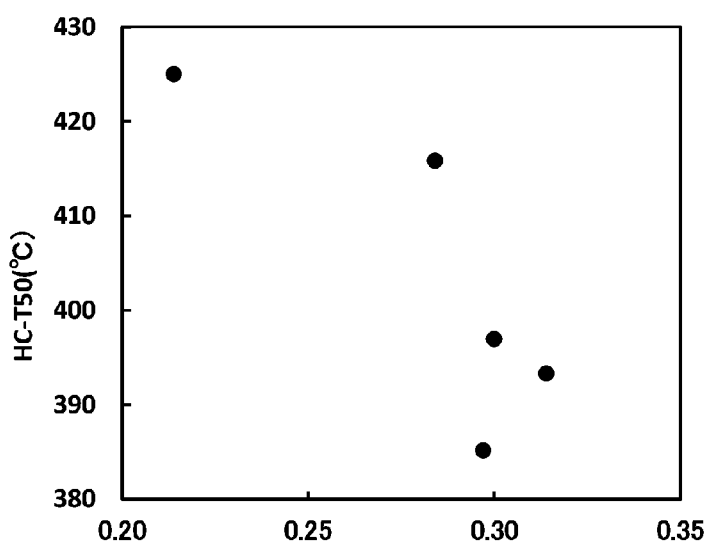
FIG. 6 A graph showing a relationship between a pore volume of pores having pore diameters of 30 nm or more in a catalyst layer and HC-T50 in Test Example 1.

FIG. 6 is a graph showing a relationship between a pore volume of pores having pore diameters of 30 nm or more and HC-T50. As shown in FIG. 6 and Table 1, the exhaust gas purification catalysts of Examples 1 through 4 in each of which a ratio of the average particle diameter Dy of the second metal oxide to the average particle diameter Dx of the first metal oxide (Dy/Dx) was 5 or more, the average particle diameter Dy of the second metal oxide was 7 μm or more, and the pore volume of pores having pore diameters of 30 nm or more was 0.28 cm³/g or more showed lower HC-T50 and higher HC purification performance after endurance than the exhaust gas purification catalyst of Comparative Example 1. This is considered to be because of synergistic effects of increased contact between an exhaust gas and the catalytic metal by obtaining 0.28 cm³/g or more of the pore volume of pores having pore diameters of 30 nm or more and increased heat resistance of the catalyst layer and suppression of deterioration of the catalytic metal by increasing the average particle diameter Dy of the second metal oxide to 7 μm or more.

Figure 7:
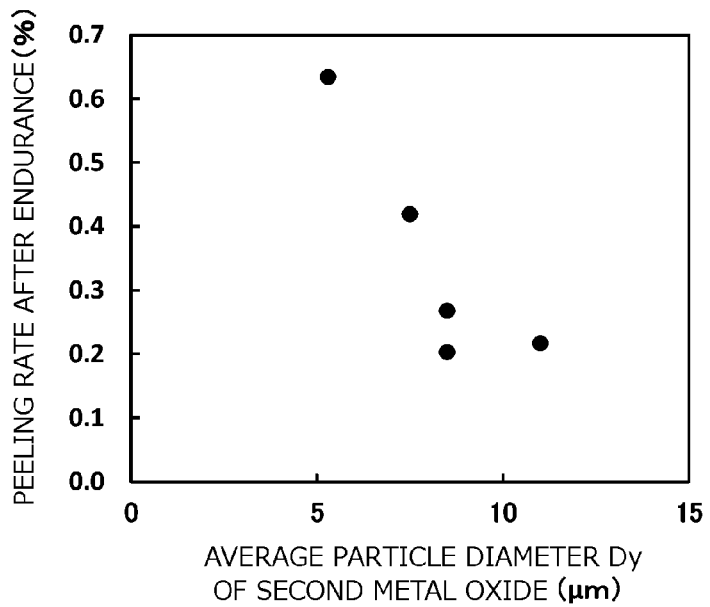
FIG. 7 A graph showing a relationship between an average particle diameter Dy of a second metal oxide and a peeling rate after duration in Test Example 1.

FIG. 7 is a graph showing a relationship between the average particle diameter Dy of the second metal oxide and the peeling rate after endurance. As shown in FIG. 7 and Table 1, the exhaust gas purification catalysts of Examples 1 through 4 show smaller initial peeling rates and smaller peeling rates after endurance and higher resistances to peeling than the exhaust gas purification catalyst of Comparative Example 1. This is considered to be because the average particle diameter Dy of the second metal oxide was increased to 7 μm or more and the ratio of the average particle diameters (Dy/Dx) was 5 or more so that particles of the first metal oxide entered between particles of the second metal oxide to enable the catalyst layer to easily have a most densely packed structure, resulting in strengthening the structure of the catalyst layer.

Test Example 2

Study in Upper-Lower Double-Layer Structure

Example 5

In this embodiment, two types of catalyst layer slurry with different compositions were prepared, and a catalyst layer having an upper-lower double-layer structure was formed on the base material.

Specifically, first, the same honeycomb base material and the same slurry 1 as those in Example 1 were prepared. Next, in a manner similar to Example 1, partitions were coated with the slurry 1, and then the slurry 1 was dried and fired, thereby forming a lower layer with a thickness of 100 μm or less on a surface of the base material.

Next, an Rh nitrate solution, the first metal oxide, the second metal oxide, and an Al₂O₃-based binder were dispersed together in a water medium, and wet ground and stirred to be mixed, thereby preparing slurry 2. Next, the slurry 2 was poured from an end portion of the base material with the lower layer and an unnecessary portion of the slurry 2 was blown out by a blower, thereby coating a portion corresponding to 100% of the entire partition length with a material. It should be noted that the coating was performed such that the coated material contains 0.4 g/L-cat of Rh, 72 g/L-cat of the first metal oxide, and 63 g/L-cat of the second metal oxide. Thereafter, a moisture content was evaporated through heating and drying for two hours with a dryer at 120° C., and then the dried product was fired for two hours with an electric heating furnace at 500° C., thereby forming an upper layer with a thickness of 100 μm or less on a surface of the lower layer.

In this manner, an exhaust gas purification catalyst of Example 5 in which two catalyst layers of the lower layer and the upper layer were stacked on the surface of the base material was obtained.

Example 6

In Example 6, an exhaust gas purification catalyst was obtained in the same manner as that of Example 5 except that the slurry of Example 2 was used in forming a lower layer.

Example 7

In Example 7, an exhaust gas purification catalyst was obtained in the same manner as that of Example 5 except that the slurry of Example 3 was used in forming a lower layer.

Comparative Example 2

In Comparative Example 2, an exhaust gas purification catalyst was obtained in the same manner as that of Example 5 except that the slurry of Comparative Example 1 was used in forming a lower layer.

Comparative Example 3

In Comparative Example 3, an exhaust gas purification catalyst was obtained in the same manner as that of Example 7 except that wet grinding was performed such that the first metal oxide had an average particle diameter Da of about 2 μm in forming a lower layer.

Comparative Example 4

In Comparative Example 3, an exhaust gas purification catalyst was obtained in the same manner as that of Example 7 except that wet grinding was performed such that the first metal oxide had an average particle diameter Da of about 3 μm in forming a lower layer.

Comparative Example 5

In Comparative Example 3, an exhaust gas purification catalyst was obtained in the same manner as that of Example 7 except that wet grinding was performed such that the first metal oxide had an average particle diameter Da of about 5 μm in forming a lower layer.

Then, in a manner similar to Test Example 1, measurement of average particle diameters Dx and Dy of the metal oxides, measurement of the pore volume of the catalyst layer, evaluation of HC purification performance, and evaluation of the peeling rate were performed. Table 2 shows results.

TABLE 2

Study in Double Layer

| | Catalyst layer | | | | | Evaluation result | | |
|---|---|---|---|---|---|---|---|---|
| | Second metal oxide (Al-containing oxide) | First metal oxide (OSC material) | | Pore capacity of pore diameter ≥30 nm in entire catalyst layer | Pore capacity of pore diameter ≥30 nm in only lower layer | HC-T50 | Peeling rate | |
| | Dy [μm] | Dx [μm] | Dy/Dx | [cm³/g] | [cm³/g] | [° C.] | Initial [%] | After endurance [%] |
| Example 5 | 11 | 1.2 | 9.2 | 0.28 | 0.23 | 335 | 0.75 | 1.71 |
| Example 6 | 7.5 | 1.1 | 6.8 | 0.30 | 0.25 | 332 | 0.83 | 2.25 |
| Example 7 | 8.5 | 1.1 | 7.7 | 0.31 | 0.39 | 329 | 1.00 | 2.50 |
| Comparative Example 2 | 5.3 | 4.5 | 1.2 | 0.26 | 0.21 | 339 | 0.67 | 0.63 |
| Comparative Example 3 | 8.5 | 2.0 | 4.3 | 0.21 | 0.18 | 347 | 3.87 | 4.69 |
| Comparative Example 4 | 8.5 | 3.0 | 2.8 | 0.22 | 0.18 | 347 | 10.29 | 5.75 |
| Comparative Example 5 | 8.5 | 5.0 | 1.7 | 0.22 | 0.18 | 346 | 11.31 | 5.96 |

Figure 8:
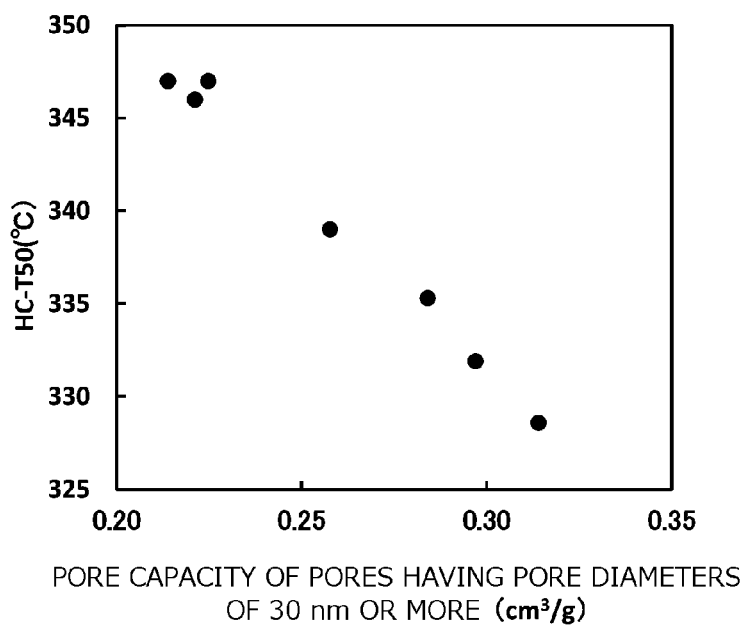
FIG. 8 A graph showing a relationship between a pore volume of pores having pore diameters of 30 nm or more in a catalyst layer and HC-T50 in Test Example 2.

FIG. 8 is a graph showing a relationship between a pore volume of pores having pore diameters of 30 nm or more and HC-T50. As shown in FIG. 8 and Table 2, the exhaust gas purification catalysts of Examples 5 through 7 show lower HC-T50 and higher HC purification performance after endurance than the exhaust gas purification catalysts of Comparative Examples 2 through 5. When the pore volume of pores having pore diameters of 30 nm or more only in the lower layer (i.e., without the upper layer) was 0.23 cm³/g or more, excellent HC purification performance after endurance was obtained.

Figure 9:
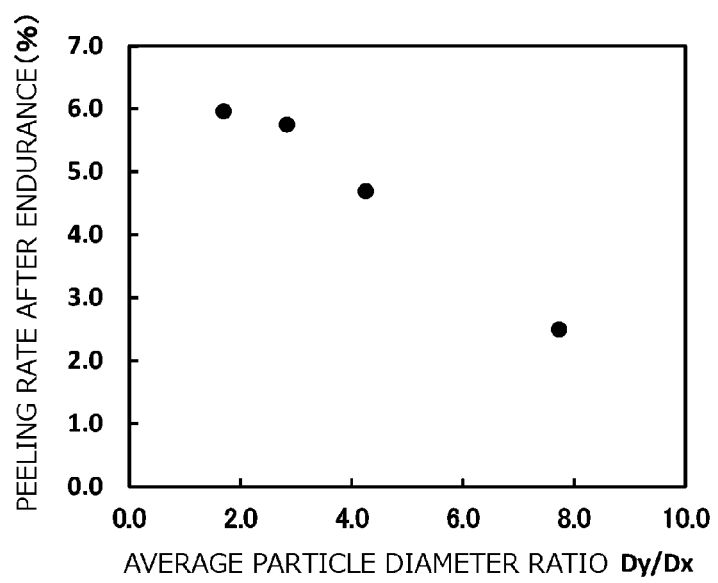
FIG. 9 A graph showing a relationship between an average particle diameter ratio (Dy/Dx) and a peeling rate in a test example in which a second metal oxide has an average particle diameter Dy of 8.5 μm in Test Example 2.

FIG. 9 is a graph showing a relationship between an average particle diameter ratio (Dy/Dx) and a peeling rate after endurance in a test example in which the second metal oxide had an average particle diameter Dy of 8.5 μm. As shown in FIG. 9 and Table 2, the exhaust gas purification catalysts of Examples 5 through 7 show smaller initial peeling rates and smaller peeling rates after endurance and higher resistances to peeling than the exhaust gas purification catalysts of Comparative Examples 3 through 5. From the foregoing reasons, even the stacked structure with two or more catalyst layers can show advantages of the technique disclosed here, in a manner similar to the case of a single-layer structure.

Some embodiments of the present invention have been described, but the embodiments are merely examples. The present invention can be carried out in other various modes. The present invention can be carried out on the basis of the contents disclosed in the description and common general knowledge in the field. The techniques described in claims include various modifications and changes of the above exemplified embodiments. For example, a part of the embodiment described above may be replaced with another embodiment, and another modified embodiment may be added to the embodiments described above. If the technical features of the embodiment are not described as essential, it may also be deleted as appropriate.

What is claimed is:

1. An exhaust gas purification catalyst comprising:
a base material; and
a catalyst layer disposed on the base material, wherein the catalyst layer includes a catalytic metal, a first metal oxide, and a second metal oxide having a higher heat resistance than a heat resistance of the first metal oxide, when Dx is an area-based average particle diameter of the first metal oxide determined from an arbitrary cross section of the catalyst layer and Dy is an area-based average particle diameter of the second metal oxide determined from the arbitrary cross section of the catalyst layer, a ratio of the Dy to the Dx (Dy/Dx) is 5 or more, and the Dy is 7 μm or more, and
a pore volume of pores having pore diameters of 30 nm or more in the catalyst layer measured by a nitrogen adsorption method is 0.28 cm³/g or more.

2. The exhaust gas purification catalyst according to claim 1, wherein
the pore volume is 0.8 cm³/g or less.

3. The exhaust gas purification catalyst according to claim 1, wherein
a ratio of the Dy to the Dx (Dy/Dx) is 6 or more and 20 or less.

4. The exhaust gas purification catalyst according to claim 1, wherein
the catalytic metal is supported by the second metal oxide.

5. The exhaust gas purification catalyst according to claim 4, wherein the catalytic metal is not supported by the first metal oxide.

6. The exhaust gas purification catalyst according to claim 1, wherein
when the first metal oxide is 100 parts by mass, a content of the second metal oxide is 50 parts by mass or more and 100 parts by mass or less.

7. The exhaust gas purification catalyst according to claim 1, wherein
the second metal oxide is an Al-containing oxide containing alumina.

8. The exhaust gas purification catalyst according to claim 7, wherein
the first metal oxide is a Ce-containing oxide containing ceria.

9. The exhaust gas purification catalyst according to claim 1, wherein
the catalyst layer includes an oxidation catalyst as the catalytic metal.

10. The exhaust gas purification catalyst according to claim 1, wherein
the catalyst layer includes
a first partial catalyst layer formed on a surface of the base material and containing the catalytic metal, and
a second partial catalyst layer formed on the first partial catalyst layer and containing the catalytic metal of a type different from the first partial catalyst layer.

11. The exhaust gas purification catalyst according to claim 10, wherein
the second partial catalyst layer contains Rh as the catalytic metal, and
the first partial catalyst layer contains Pd as the catalytic metal.

12. The exhaust gas purification catalyst according to claim 10, wherein
in the first partial catalyst layer, a pore volume of pores having pore diameters of 30 nm or more measured by a nitrogen adsorption method is 0.23 $cm^3/g$ or more.

* * * * *